Figure 1:
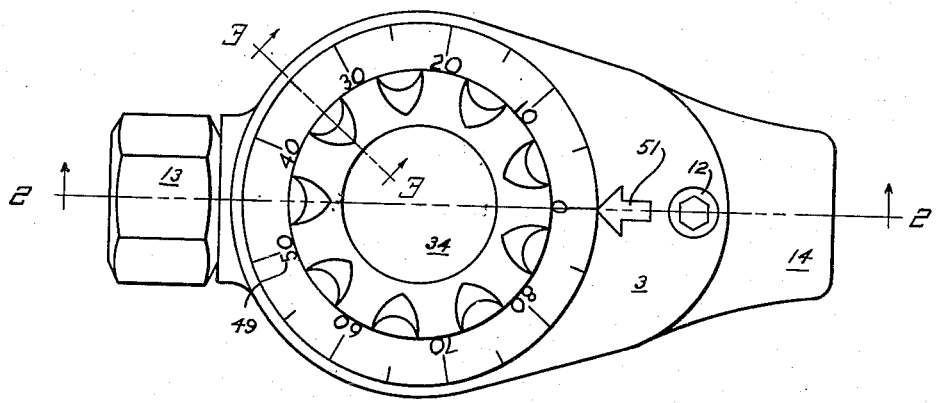

Dec. 8, 1953

E. O. ANDERSON 2,661,760

PULSATING TYPE TIRE GAUGE

Filed April 12, 1948

INVENTOR
ERNEST O. ANDERSON
BY Charles S. Evans
his ATTORNEY

Patented Dec. 8, 1953

2,661,760

UNITED STATES PATENT OFFICE 2,661,760

PULSATING TYPE TIRE GAUGE

Ernest O. Anderson, San Jose, Calif.

Application April 12, 1948, Serial No. 20,492

6 Claims. (Cl. 137—225)

My invention relates to air pressure gauges used for filling automobile tires.

One of the objects of the invention is the provision of an air pressure inflation gauge which automatically shuts off the delivery of air at a predetermined pressure in the tire.

My invention has other objects which will be explained in the following description of the invention which is illustrated in the drawings. It is to be understood, however, that the invention is not limited to the embodiment described, but may be included in a variety of forms as set forth in the claims.

Figure 2:
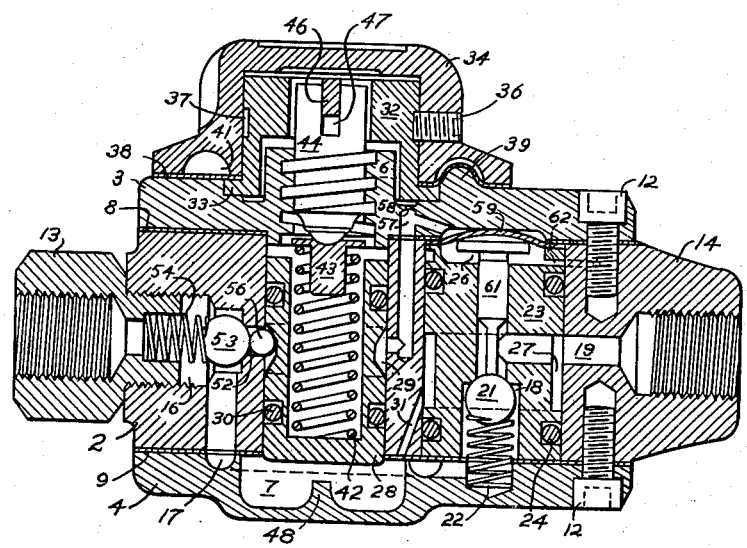
Figure 3:
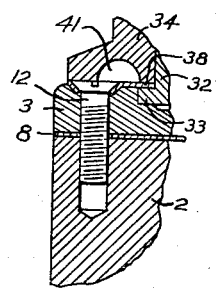

Referring to the drawings: Figure 1 is a plan view of the tire gauge of my invention; and Figure 2 is a vertical section, the plane of which is indicated by the line 2—2 of Figure 1. Figure 3 is a detail in section of the block, cover plate and knob assembly, taken along the line 3—3 of Figure 1 in the direction indicated.

Broadly considered, my device comprises a block with inlet and outlet fittings for connection to a receiver and a flexible line. Between the inlet and outlet fittings is a passage controlled by a main valve, the opening or closing of which controls the flow of air from the receiver to the tire. A spring-loaded piston is slidably arranged in the block, and one side of the piston chamber is connected to a discharge passage so that the pressure in the tire is reflected in a corresponding pressure against the piston. Manually-operated means are mounted on the block for varying the load on the piston, and this means is calibrated on a readily visible index in pounds per square inch, which is equivalent to tire pressure.

A tappet is also provided in the block for opening the main valve; and means operated by the piston are arranged to permit the flow of pressure air into a chamber closed by a diaphragm bearing against the tappet. This chamber is vented into the open air so that the pressure against the tappet to open the main valve is relieved almost instantly, thus permitting the main valve to close. The result of this mechanism is the admission of a succession of puffs of air under pressure to the discharge passage; and since the discharge pressure is reflected in the pressure against the main piston, the building up of the pressure in the tire to balance the spring pressure means the return of the piston to a position in which air is no longer admitted to the passage leading to the tappet-operating diaphragm. At this point the air in the tire has reached the predetermined pressure; and the operation of the valve ceases.

In more detail and with reference to the drawings, my pressure gauge includes a block 2 provided with a cover plate 3 and a base plate 4. An internally threaded annular shoulder 6 is formed on the cover plate; and a balance chamber 7 is formed in the base plate opposite the shoulder on the cover plate. Gaskets 8 and 9, interposed between the block and the cover and base plates respectively, seal the spaces between them; and screws 12 hold the assembly rigidly together.

The block is drilled and tapped at one end to receive an air line inlet fitting 13; and an integral annular extension at the opposite end is tapped to provide an outlet fitting 14, threaded as shown to receive the usual flexible tire hose having the conventional terminal chuck.

A main passage connecting the inlet and outlet fittings extends through the block. The passage commences with a chamber 16 into which the inlet fitting 13 opens, and is connected by pressure passage 17 between the block and the base plate to main valve chamber 18, near the opposite end of the block.

A discharge passage 19 connected to the main valve chamber opens into the outlet fitting 14, and a normally closed main valve, consisting of ball bearing 21 pressed by spring 22, is interposed between the valve chamber and the passage. For convenience in manufacture and assembly, the block 2 is bored to receive insert plug 23, in which the valve chamber and part of the discharge passage are arranged; and conventional sealing rings 24 surround the plug to afford a leak-proof seal between the plug and the block.

A control chamber 26 in one end and annular groove 27 on the surface and intersecting discharge passage 19 are formed on the insert plug.

Means are provided for controlling the amount of air delivered through the main passage. Slidably mounted in the block in a bore opening into the balance chamber 7 is a hollow control piston 28, with an annular sloping walled groove 29 formed on its surface about midway between its ends. The control piston is provided with sealing rings 30 to render the fit between piston and block substantially air-tight.

Pressure air from the discharge passage 19 is admitted to the balance chamber 7 through groove 27 on the insert plug, which is connected to the balance chamber with balance duct 31.

The piston-loading means of the gauge are controlled from outside the block. An annular cap 32 having a flange 33 flush with the surface of the cover plate 3 is arranged for rotation over annular shoulder 6 of the plate; and knob 34 is fixed to the cap with set-screw 36, impinging in shallow groove 37 thereon. Such an arrangement renders the cap and knob relationship readily adjustable.

Plate 38, secured to the cover plate with screws 12, as shown, projects over the outwardly-extending flange 33 on the cap to retain the cap and knob on the cover plate. A short upwardly-projecting stop 39 rides in groove 41 on the underside of the knob; and a bridge in the groove limits the rotation thereof.

A control spring 42 in the hollow piston 28 loads the piston; and at its free end the spring presses boss 43, which is interposed between the spring and a spindle 44, threaded in the annular shoulder 6 of the cover plate. A bar 46, fixed across the inside of knob 34, engages a slot 47 in the free end of the spindle, permitting the spindle to move freely in an axial direction during rotation. It will be seen that rotation of the knob in a clockwise direction will advance the spindle and thus load the spring, moving the piston into the balance chamber 7. A short stud 48 on the base plate 4 extending into the chamber limits the penetration of the piston.

The spring is calibrated in pounds per square inch load on the piston, and corresponding indicia 49 on the knob, when moved opposite the arrow 51 on the plate, indicate the amount of rotation required to produce a predetermined load.

Means operated by the movement of the piston are arranged to open the main valve. A pilot passage 52 opens out of the chamber 16, connecting it with the groove 29 on the piston; and a normally-closed pilot valve, consisting of ball bearing 53 pressed by spring 54, is arranged in the passage, similar to the main valve previously described.

A smaller ball bearing 56, whose diameter is approximately equal to the distance between the bottom of the groove 29 and the surface of the ball bearing 53, is carried in the pilot passage; and it will be seen that movement of the piston 28 will move the small ball back into the passage 52, displacing spring-pressed ball 53 and connecting the passage with the chamber 16.

The pilot passage 52 is connected through the piston groove 29 and pilot duct or chamber 57 to the control chamber 26. A restricted vent 58 through the cover plate releases the pressure in the control chamber to the atmosphere almost immediately after the pressure in it builds up.

Pressure-actuated means in the control chamber open the main valve. A tough resilient diaphragm 59 is disposed across the chamber, being secured between the insert plug 23 and the cover plate; and a tappet 61, bearing against the diaphragm, abuts at its free end the ball bearing 21 of the main valve. It will be seen that when air pressure in the control chamber distends the diaphragm in a downward direction, the tappet 61 is moved to displace ball bearing 21, and open the main valve chamber 18 into the discharge passage 19.

Any pressure in the control chamber beneath the diaphragm is released to the atmosphere through vent 62, extending through the insert plug 23 and block 2.

The operation of the gauge when interposed in a tire inflating hose is as follows: Assume first that the parts are in idle or inactive condition, that the knob 34 has been set at zero reading, and that the chuck of the tire hose is not applied to the tire valve stem. The coil spring 42 is then without compression and the control piston 28 is in upper position, where it was moved by the pressure of air in the balance chamber 7, it being remembered that after the first use air at the pressure of the last tire serviced, remains in the hose and balance chamber. While this may be reduced by leakage, especially if it was high initially, there always remain the few pounds necessary to lift the control piston, movement of which is lightly braked by the sealing rings around it.

Let it now be assumed that the tank pressure is within the desired range, say 150 pounds; and that a tire is to be inflated to 35 pounds. The tire hose chuck is applied to the tire valve stem. Full tank pressure is on the tank line, pressure passage and main valve chamber. The knob is turned to register the arrow with the figure "35." This turns down the threaded spindle 44 against the control spring 42, which moves the control piston to a lower position, opening the pilot valve between chamber 16 and pilot passage 52, and allowing pressure air to flow through the pilot duct 57 to control chamber 26. The air presses down the diaphragm 59 and tappet 61, opening the main valve and allowing air at tank pressure to enter the discharge passage 19 and tire hose. At the instant that main valve 21 is opened, air under pressure also surges back through the balance duct 31 and into the balance chamber 7. The proportions of the parts are such that a surge of pressure of only a fraction of the full tank pressure is required in the balance chamber to kick the piston upward and thus effect closing of the pilot passage 52.

Simultaneous to closing of the pilot passage, the pressure in the control chamber is released through the vent 58, allowing the main valve to be closed by its spring, but not until a puff of high pressure air has jetted through the valve and into the discharge passage and the tire, and back through passages 27 and 31 to chamber 7, raising the tire pressure a pound or two, and kicking the piston 28 upwardly to permit a momentary closing of the valve 53, which is promptly opened again by the rebound of the piston on the spring. In the interval that the main valve remains closed, there is an equalization of pressure in the tire, tire hose and discharge passage 19, it being understood that it is not the equalized pressure which kicks the piston upward. This is done by the initial surge of air pressure when the main valve is opened. The equalized pressure backs up through the small balance duct 31 into the balance chamber 7 where between the puffs of high pressure air it gradually builds up to tire pressure and presses back the control piston to upper position, allowing the pilot valve to remain closed.

With each puff of high pressure air, the parts return to first position; whereupon the cycle repeats rapidly, each one adding a puff of high pressure air to the discharge passage and raising the tire pressure a corresponding amount. As the pressure builds up in the tire, the equalized pressure under the control piston also increases, until within a brief period, the resistance of the spring is overcome and the piston is pushed to its upper position and held there, all gauge operation ceasing.

The arrangement and proportion of the parts are such that when this happens, the tire pressure in pounds per square inch is that indicated by the number to which the knob was set. The tire hose is now removed from the tire and is ready for use on another tire at the same or another setting of the knob.

I claim:

1. An automatic tire inflation gauge comprising a block having a main passage therethrough, a normally closed main valve in the passage, a balance chamber in the block connected into the main passage on the discharge side of the main valve, a piston closing the chamber, a spring bearing against the piston to move it into the chamber, a spindle threaded in the block for compressing the spring, a cap journaled on the block and connected for rotation with the spindle, a knob calibrated in pounds of pressure per square inch and adjustably rotatable on said cap, a vented pilot chamber in the block, pressure actuated means in the pilot chamber for opening the main valve, a pilot passage connecting the main passage to the pilot chamber, a pilot valve normally closing the pilot passage, and means operative with movement of the piston into the balance chamber for opening the pilot valve.

2. An automatic tire inflation gauge comprising a block having a main passage therethrough, a normally closed main valve in the passage, a balance chamber in the block connected into the main passage on the discharge side of the main valve, a piston closing the chamber and having therearound an annular groove having a lateral cam face, a spring bearing against the piston to move it into the chamber, means including a calibrated knob for variably loading the control spring, a vented pilot chamber in the block, pressure actuated means in the pilot chamber for opening the main valve, a pilot passage including the annular groove and connecting the main passage to the pilot chamber, a pilot valve normally closing the pilot passage, and means actuated by the cam face of the annular groove when the piston moves into the balance chamber for opening the pilot valve.

3. An automatic tire inflation gauge comprising an elongated block having a main passage therethrough for the admission of air under pressure into the block and its discharge therefrom, the entrance and discharge portions of said passage being substantially aligned and on a central long axis of the block, a pair of parallel bores through the block at right angles to said long axis, a control piston in one of said bores and a fixed plug in the other bore and having therein passages forming part of the main passage, chambered caps overlying both ends of the bores and fixed on the block, the cap on one side providing a chamber constituting part of the main passage and a balance chamber opposite one end of the control piston, a normally closed main valve in the plug portion of the main passage, connected passages in the block and the plug connecting the balance chamber into the main passage on the discharge side of the main valve, a spring bearing against the control piston, means including a calibrated knob for variably loading the spring and arranged on one of said caps, a vented pilot chamber in the block and last named cap and plug, pressure actuated means in the pilot chamber for opening the main valve, a pilot passage connecting the main passage to the pilot chamber, a pilot valve normally closing the pilot passage, and means operated by the control piston in its movement for opening and closing the pilot valve.

4. An automatic tire inflation gauge comprising a compact portable block having a main passage therethrough to receive and discharge air under pressure, one only normally closed spring-pressed main valve in the main passage, a stem extending from the closed side of the main valve, one only coiled control spring arranged in the block, a rotatable spindle threaded in the block for variably loading the control spring, a hollow knob directly connected to the spindle for rotation thereof and overlying the block in axial alignment with the control spring, a balance chamber in the block and axially aligned with the control spring, means axially aligned with the control spring and forming a wall of the chamber and movable by the control spring to constrict the chamber and movable by pressure in the chamber to tension the control spring, means rendered operative by the control spring and including said chamber wall and a resiliently loaded cam for moving the main valve stem to operate the main valve to open and close the main passage, and a free passage in the block directly connecting said chamber with the main passage on the discharge side of the main valve.

5. An automatic tire inflation gauge comprising a compact portable block having a main passage therethrough to receive and discharge air under pressure, one only normally closed spring-pressed main valve in the main passage, one only coiled control spring arranged in the block, a rotatable spindle threaded in the block for variably loading the control spring, a balance chamber in the block and axially aligned with the control spring, means forming a wall of the chamber and axially aligned with and movable by the control spring to constrict the chamber and movable by pressure in the chamber to tension the control spring, means rendered operative and governed by the loading of said control spring against the pressure in said balance chamber including a resiliently loaded cam device for unseating said main valve to open the main passage, and a free passage in the block directly connecting said balance chamber with the main passage on the discharge side of the main valve whereby pressure in the balance chamber is equalized with pressure in the main passage to effect closing of the main valve.

6. An automatic tire inflation gauge comprising an elongated block having a main passage therethrough for the admission of air under pressure into the block and its discharge therefrom, the entrance and discharge portions of said passage being substantially aligned and on a central long axis of the block, a pair of parallel bores through the block at right angles to said long axis, a control piston in one of said bores and a fixed plug in the other bore and having therein passages forming part of the main passage, chambered caps overlying both ends of the bores and fixed on the block, the cap on one side providing a chamber constituting part of the main passage and a balance chamber opposite one end of the control piston, a normally closed main valve in the plug portion of the main passage, connected passages in the block and the plug connecting the balance chamber into the main passage on the discharge side of the main valve, a spring bearing against the control piston, means including a calibrated knob for variably loading the spring and adjustably rotatable on one of said caps, a pilot chamber in the block having a vent to the open air, pressure actuated means in the pilot chamber for opening the main valve, a pilot passage connecting the main passage to the pilot chamber, a pilot valve normally closing the pilot passage, and means operated by the control piston in its movement for opening and closing the pilot valve.

ERNEST O. ANDERSON.

References Cited in the file of this patent

UNITED STATES PATENTS

| Number | Name | Date |
|---|---|---|
| 1,139,533 | Kitchen | May 18, 1915 |
| 1,618,953 | Penn | Feb. 22, 1927 |
| 1,632,619 | Morley | June 14, 1927 |
| 1,661,186 | Manson | Mar. 6, 1928 |
| 1,745,202 | Anderson | Jan. 28, 1930 |
| 1,903,233 | Gille | Mar. 28, 1933 |
| 2,042,190 | Ragan | May 26, 1936 |
| 2,067,882 | Alessi | Jan. 19, 1937 |
| 2,343,146 | Jenkins | Feb. 29, 1944 |
| 2,344,256 | Lyon | Mar. 14, 1944 |
| 2,470,372 | Roth | May 17, 1949 |